United States Patent [19]

Hope nee Swiecicki

[11] 4,325,212

[45] Apr. 20, 1982

[54] LAYING OPTICAL WAVEGUIDES AND ELECTRICAL CONDUCTORS ONTO A SUPPORT FILAMENT

[75] Inventor: Tomasz S. Hope nee Swiecicki, Kanata, Canada

[73] Assignee: Northern Telecom Limited, Montreal, Canada

[21] Appl. No.: 208,567

[22] Filed: Nov. 20, 1980

[51] Int. Cl.³ .................... D02G 3/44; D01H 13/04; B65H 81/08

[52] U.S. Cl. ............................. 57/15; 57/9; 57/13

[58] Field of Search .............. 57/3, 6, 9, 11, 12, 57/13, 15, 16, 17, 18, 249, 293, 352, 361

[56] References Cited

U.S. PATENT DOCUMENTS

| | | | |
|---|---|---|---|
| 4,156,624 | 5/1979 | Vecchis et al. | 57/13 X |
| 4,216,645 | 8/1980 | Andersen | 57/13 X |
| 4,224,787 | 9/1980 | Jackson et al. | 57/15 |
| 4,237,687 | 12/1980 | Vecchis et al. | 57/13 X |

*Primary Examiner*—Donald Watkins
*Attorney, Agent, or Firm*—R. J. Austin

[57] ABSTRACT

Laying optical waveguides and electrical conductors onto a support filament in two separate laying operations spaced along a feed path of the filament.

3 Claims, 4 Drawing Figures

LAYING OPTICAL WAVEGUIDES AND ELECTRICAL CONDUCTORS ONTO A SUPPORT FILAMENT

This invention relates to assembling optical waveguides and electrical conductors onto a support filament.

Suggestions have been made in the manufacture of optical cable, to locate optical waveguides in a grooved support filament. It has also been proposed to locate electrical conductors in grooves of the support filament to act as transmission lines and enable installers of a completed optical cable or inspectors or repairers of previously installed optical cables to communicate with one another from widely spaced positions along the cable. The electrical conductors may also be for connection to remote pressure and temperature sensors.

It is recognized that when optical waveguides and electrical conductors are both laid into grooves of the support filament by drawing them from storage reels, the tension in the waveguides needs to be less than that in the conductors. Because of this, the waveguides form larger catenaries than the conductors as they are being fed onto the filament. It has been found that this has resulted in certain paths of the waveguides crossing those of the conductors enabling the more tensioned conductors to drag the loops of the waveguides onto the filament where the loops become trapped. Clearly, this problem cannot be tolerated in commercial operations as it would result in frequent stoppages in the laying-in apparatus thus making the process unattractive.

According to the present invention, in a method of laying a set of optical waveguides and a set of electrical conductors on a support filament, the support filament is moved along a feed path and the two sets are laid onto the filament at two spaced laying positions along the feed path.

In one method, the electrical conductors are laid on the filament before the optical waveguides. However, the waveguides may be laid on firstly.

For the purpose of maintaining the feed path for the support filament as short as possible, the waveguides and conductors are fed from positions upstream of the two laying positions and pass side-by-side along the feed path up to a first of the two laying positions, the sets being held separated from one another as they move towards said first laying position, and one of the sets continuing to the second position.

According to the invention also, apparatus is provided for laying a set of optical waveguides and a set of electrical conductors on a support filament, the apparatus comprising one laying unit for the waveguides, another laying unit for the electrical conductors, the laying units being spaced apart in laying positions along a feed path for the support filament through the apparatus, reeling-off positions for the waveguides and conductors upstream of the units to feed the sets side-by-side along the feed path up to a second of the laying positions, and means for holding one set separated from the other set as they move towards the first laying position.

In a preferred arrangement, the laying unit at the first laying position is of annular form with a central aperture for passage therethrough of the filament along its feed path, and it comprises means disposed around the central aperture for guiding and laying members of one of the sets onto the filament, and guide means spaced radially outwardly from the aperture for guiding members of the other set towards the unit at the second position and for holding the two sets separated as they are fed towards the first position.

One embodiment of the invention will now be described, by way of example, with reference to the accompanying drawings, in which.

Figure 1:
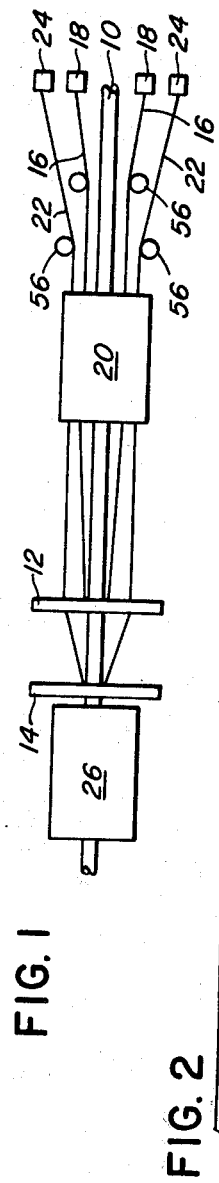
FIG. 1 is a diagrammatic side elevational view of apparatus for laying optical waveguides and electrical conductors onto a support filament.

As shown generally in FIG. 1, apparatus for laying optical waveguides and electrical conductors onto an extruded plastics support filament 10 during optical cable manufacture comprises two laying structures 12 and 14 disposed in a lay station in spaced-apart positions along a feed path for the filament.

A set of electrical conductors 16 are fed from reels 18 in a reeling-off position upstream of the lay station and pass through a replacement spool support means carrying replacement spools 20 before reaching the first laying structure 12. A set of optical waveguides 22 are fed from reels 24 in the reeling-off position, through the replacement spool support means and also through the structure 12 to the second laying structure, 14, the structure 12 having guide means, as will be described, to hold the optical waveguides separated from the electrical conductors as they are fed towards structure 12. Downstream of the laying structure 14 is a binding unit 26 for binding tape onto the filament after laying of the waveguides and conductors.

Figure 2:
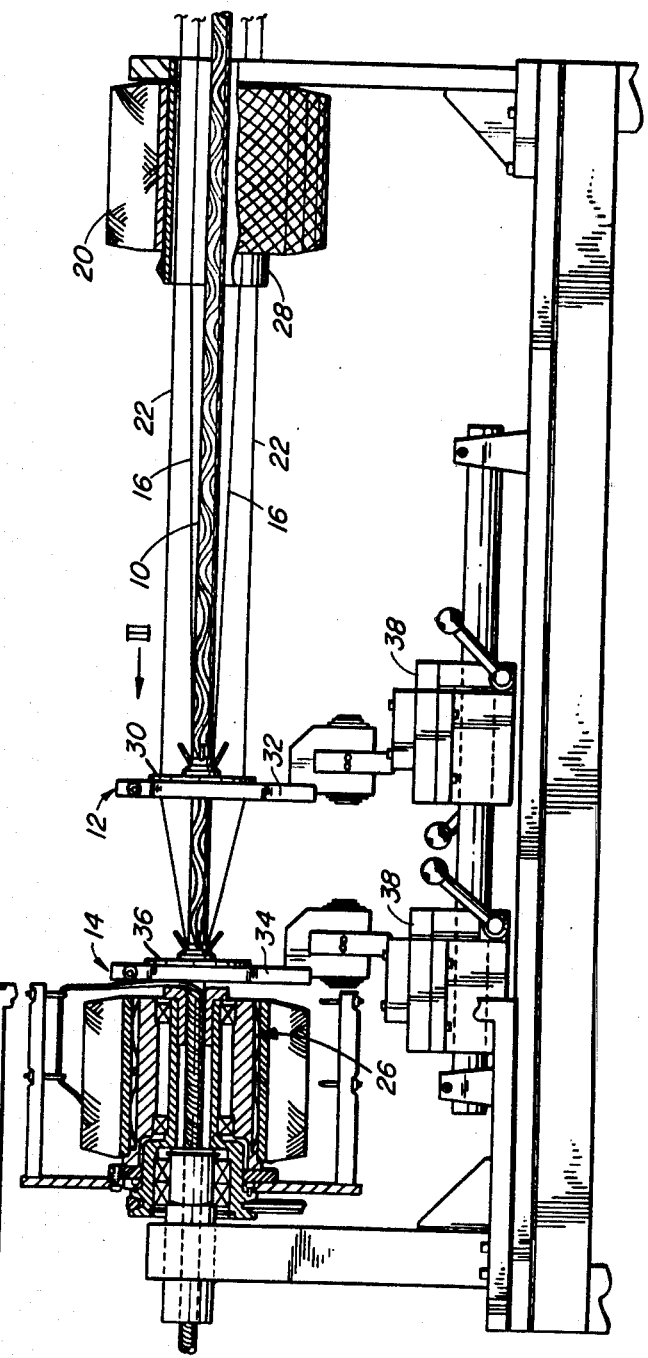
FIG. 2 is a side elevational view, partly in section, of part of the apparatus of FIG. 1 and on a larger scale than FIG. 1.

The apparatus is shown in greater detail in FIG. 2. Replacement spools 20 are mounted upon a tube 28 of the support means. The laying structure 12 comprises a laying unit 30 mounted in a holding means comprising two yokes 32. Two similar yokes 34 hold the laying unit 36 of the laying structure 14. The construction of the yokes and manner of attaching them to support platforms 38, and the construction of unit 26 and the method of locating a replacement spool on the unit 26, are as described in application Ser. No. 208,565, filed Nov. 20, 1980, entitled "Laying and Binding Optical Waveguides Onto A Support Filament" and in the name of Miguel Fombellida. This part of the apparatus will not, therefore, be described in further detail in this application.

The laying unit 36 for laying the optical waveguides 22 into sinusoidal grooves 40 of the support filament is as described in application Ser. No. 208,838 filed Nov. 20, 1980, entitled "Control of A Support Filament for Optical Waveguides" in the name of Tomasz Stanislaw Hope and Miguel Fombellida, and will be described no further in this application.

The laying unit 30 is also described in detail in the above referred to application Ser. No. 208,838, entitled "Control of A Support Filament For Optical Waveguides". However, for the purposes of the present invention, certain details will be discussed in this application.

The laying unit 30 comprises an annular housing 42 within which is rotatably mounted an annular groove follower 44. The follower is provided with six groove follower needles 46, equally spaced around the major axis of the follower and inclined to the axis with radially inner ends laying downstream of the feed path of the filament through a central aperture 48. The inner ends of the needles project into the aperture to engage within grooves 40 of the filament as it moves along its feed path. The needles thereby form groove follower probes which cause the follower 44 to rotate alternately in one direction and then the other by virtue of the angular disposition of the parts of the needles engaged by the grooves.

Figure 4:
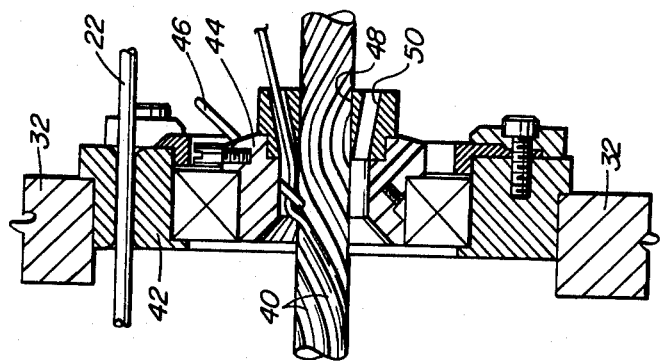
FIG. 4 is a section along line IV—IV in FIG. 3.

Inner ends of the needles are formed with apertures through which the electrical conductors are fed after being passed through orifices 50 of the follower as shown in FIG. 4. One only of the needles and conductors 16 is shown in FIG. 4 for clarity. The conductors are thereby fed into certain of the grooves as shown by that Figure.

Figure 3:
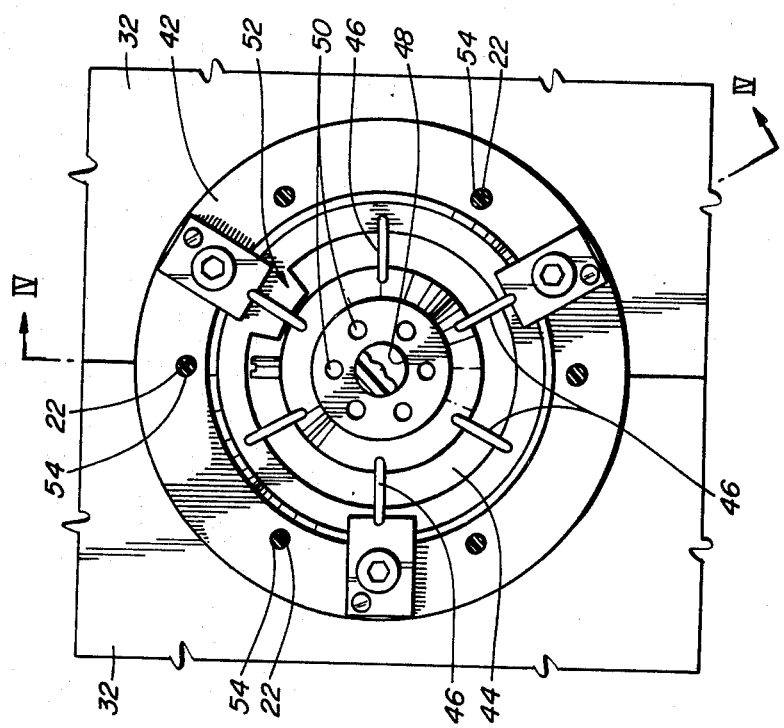
FIG. 3 is a view of a laying unit of the apparatus in the direction of Arrow III in FIG. 2.

The laying unit 30 also acts as a twist limiting device for the filament 10 and for this purpose, a rotation limiting means (shown generally at 52, FIG. 3), is provided to prevent rotation of of the follower by more than a predetermined amount. Details of the rotation limiting means are given in the previously referred to application Ser. No. 208,838, entitled "Control of A Support Filament for Optical Waveguides".

The laying unit 30 also comprises means to hold the set of optical waveguides 22 separated from the group of conductors as they move downstream to the structure 12. This means comprises guide surfaces of six guide holes 54 equally spaced apart around the housing 42.

In use, as may be seen from FIGS. 1 and 2, the waveguides and conductors are fed from respective reels, around freely rotatable rollers 56 and then through the tube 28 towards the structure 12. As the conductors are fed towards structure 12, they converge and pass through the orifices 50 of follower 30 to be laid into the grooves of the filament. In contrast, the waveguides are held outwardly from the filament 10 and from the conductors by the guides holes 54 through which they pass to the laying structure 14.

As may be seen from above, the apparatus successfully holds the waveguides away from the conductors while they proceed side-by-side towards their laying positions and thus prevents the waveguides from being dragged along the paths of the conductors because of contact therewith. Hence, with this apparatus, the waveguides and conductors may be dispensed from upstream of both laying positions, thus ensuring that the laying positions need be only a small distance apart. This avoids having to extend the length of the apparatus needlessly as in a case where the reeling off position for the waveguides occurs downstream of the laying unit for the conductors as such an arrangement would result in a huge increase in distance between the laying positions.

What is claimed is:

1. Apparatus for laying a set of optical waveguides and a set of electrical conductors on a support filament, the apparatus comprising one laying unit for laying waveguides on the filament, another laying unit for laying conductors on the filament, the laying units being spaced apart in laying positions along a feed path for the support filament through the apparatus, reeling-off positions for the waveguides and conductors upstream of the units to feed the sets of waveguides and conductors side-by-side to a first of the laying positions and one of the sets to a second of the laying positions, and means for holding one set separated from the other set as they move to the first laying position.

2. Apparatus according to claim 1 wherein the laying head at the first laying position is of annular form with a central aperture for passage therethrough of the filament along its feed path, said laying head at the first position comprising means disposed around the central aperture for guiding and laying the members of one set onto the filament, and guide means spaced radially outwards from the aperture for guiding members of the other set towards the unit at the second position and for holding the two sets separated as they are fed towards the first position.

3. A method of laying a set of optical waveguides and a set of electrical conductors on a support filament, comprising moving the support filament along a feed path, feeding the two sets from positions upstream of two spaced laying positions along the feed path, passing the waveguides and conductors side-by-side towards a first of the two laying positions while holding the waveguides and conductors separated from one another as they pass to the first laying position, and laying one of the two sets onto the filament at the first laying position, the other set continuing to a second of the two laying positions before being laid onto the filament.

* * * * *